(12) United States Patent
Fioravanti

(10) Patent No.: US 6,597,163 B2
(45) Date of Patent: Jul. 22, 2003

(54) CONTAMINATION RESISTANT PROBE ATTACHMENT DEVICE

(75) Inventor: Louis John Fioravanti, Boulder, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/886,694

(22) Filed: Jun. 20, 2001

(65) Prior Publication Data

US 2002/0011834 A1 Jan. 31, 2002

Related U.S. Application Data

(60) Provisional application No. 60/220,724, filed on Jul. 26, 2000.

(51) Int. Cl.⁷ .................. G01R 1/06; G01R 31/02; G01N 27/72; F16J 15/50; F16H 55/06
(52) U.S. Cl. .................. 324/149; 324/72.5; 324/226; 74/18; 74/18.1; 74/464
(58) Field of Search ............. 324/149, 72.5, 324/226; 74/18, 18.1, 464

(56) References Cited

U.S. PATENT DOCUMENTS

| | | | |
|---|---|---|---|
| 3,447,071 A | 5/1969 | Morris et al. ............. 324/464 |
| 4,030,615 A | 6/1977 | Guggi et al. ............... 414/8 |
| 4,065,956 A | 1/1978 | Trattner et al. ............. 73/9 |
| 4,170,420 A | 10/1979 | Underwood ............. 366/137 |
| 4,314,560 A * | 2/1982 | Helfgott et al. ............. 606/171 |
| 4,591,794 A | 5/1986 | Shattuck et al. ............. 324/464 |
| 4,700,489 A * | 10/1987 | Vasile ..................... 33/342 |
| 4,706,019 A | 11/1987 | Richardson ............. 324/751 |
| 4,781,520 A * | 11/1988 | Balter ..................... 414/8 |
| 4,788,489 A * | 11/1988 | Kobayashi et al. ......... 324/660 |
| 4,850,779 A | 7/1989 | Cashell et al. ............. 414/3 |
| 5,051,105 A | 9/1991 | Sugiura et al. ............. 464/175 |
| 5,145,191 A * | 9/1992 | Stewart et al. ............. 277/212 |
| 5,148,108 A * | 9/1992 | Dufour |
| 5,222,303 A * | 6/1993 | Jardine ..................... 33/528 |
| 5,295,914 A * | 3/1994 | Milavec ..................... 464/175 |
| 5,312,300 A * | 5/1994 | McGregor et al. ......... 464/175 |
| 5,345,935 A * | 9/1994 | Hirsch et al. ............. 600/376 |
| 5,562,005 A | 10/1996 | Boyen et al. ............. 74/18.2 |
| 5,655,778 A | 8/1997 | Cavanaugh ............. 277/315 |
| 5,828,280 A | 10/1998 | Spivey, Jr. et al. ......... 335/216 |
| 5,969,531 A * | 10/1999 | Murakami et al. ......... 324/545 |
| 5,996,424 A * | 12/1999 | Tan et al. ............... 73/864.34 |
| 6,386,551 B1 * | 5/2002 | Martin ..................... 277/634 |

\* cited by examiner

Primary Examiner—N. Le
Assistant Examiner—Wasseem H. Hamdan
(74) Attorney, Agent, or Firm—Merchant & Gould P.C.

(57) ABSTRACT

A contamination resistant probe attachment device attaches over an opening in a top cover of a disc drive to couple a testing probe to the interior of the disc drive. The attachment device has a base for surrounding and attaching around the opening in the top cover in the disc drive and a centrally located aperture for communicating with an upwardly extending flexible tube. The flexible tube having a first and second end, the first end attaching to the base and a second end defining an engagement opening through which a disc drive testing probe is inserted. Seals formed by the contamination resistant probe attachment device, the top cover and the testing probe form a resistant barrier between the interior environment of the disc drive and exterior environment of the disc drive, allowing for probe mediated testing to occur outside the confines of either a clean hood, dedicated clean room or any environment where the disc drive external environment is more contaminated than the internal environment of the disc drive.

23 Claims, 6 Drawing Sheets

CONTAMINATION RESISTANT PROBE ATTACHMENT DEVICE

RELATED APPLICATIONS

This application claims priority of U.S. provisional application Serial No. 60/220,724, entitled "CONTAMINATION RESISTANT PROBE ATTACHMENT DEVICE," filed Jul. 26, 2000.

FIELD OF THE INVENTION

This application relates generally to magnetic disc drives and more particularly to a device designed to facilitate probe mediated testing on a disc drive in a typical laboratory environment, i.e., non-clean room environment.

BACKGROUND OF THE INVENTION

Disc drives are data storage devices that store digital data in magnetic form on a storage medium on a rotating information storage disc. Modern disc drives include one or more rigid discs that are coated with a magnetizable medium and are mounted on the hub of a spindle motor for rotation at a constant high speed. Information is stored on the discs in a plurality of concentric circular tracks typically by an array of heads mounted to a radial actuator for movement of the heads relative to the discs. Each of the concentric tracks is generally divided into a plurality of separately addressable data sectors. The read/write head is used to transfer data between a desired track an external environment. During a write operation, data is written onto a disc track and during a read operation the head senses the data previously written on the disc track and transfers the information to the external environment.

In order to produce a high quality disc drive device, as well as to design alternative disc drives and disc drive components, disc drive manufacturers perform a number of specified tests on the disc drive and its components. These tests often require that an airtight seal on the disc drive be breached and access to the interior of the disc drive be accorded to any number of analytical testing probe(s), for instance, insertion of a capacitance probe, laser doppler velocimetry (LDV) probe, photonic sensor, etc. Breach of the disc drive seal allows air from the disc drive's external environment to enter the disc drive's internal environment. As such, the testing must often, if not always, be performed in an environment relatively free of contamination, because contamination that gets into an operating disc drive can lead to damage to the read/write heads and to the data recorded on the information storage disc. Damage to these structures ultimately leads to "head crashes," i.e., a collision of a head with the magnetizable medium of the information storage disc, which in some cases may occur in as few as fifteen to twenty minutes of operation in a contaminated environment. Therefore, disc drive testing must often be performed under relatively contamination free conditions.

Currently, disc drive related testing is performed in either a class 100 environment or under a clean hood where particulate matter and other forms of contamination are filtered from the testing environment. However, it is often inconvenient, expensive and space limiting to perform all disc drive related tests under these clean hood/dedicated clean room conditions, especially in the cases where bulky or highly complex equipment must be employed to perform the testing procedure on the drive. Rather, it would be convenient, cost effective and possibly increase productivity to be able to perform a number of probe mediated tests on a disc drive in the absence of the constraints of working under a hood or in a dedicated clean room.

Accordingly, there is a need in the relevant art to overcome the obstacles prevalent in disc drive testing, in particular there is a need in the relevant art for a device and method that allows for disc drive testing to be performed in an ambient, contaminate containing, laboratory environment, where the testing environment is not dedicated to disc drive testing. Against this backdrop the present invention has been developed.

SUMMARY OF THE INVENTION

The present invention is a contamination resistant probe attachment device for use with probe mediated testing procedures on a disc drive, where the testing is performed through an opening in the top cover of the disc drive in a contamination containing environment.

One exemplary embodiment of the present invention is a contamination resistant probe attachment device for coupling a testing probe to the interior of the disc drive. The contamination resistant probe attachment device protects the disc drive from contamination from outside the disc drive during a probe-mediated test. The contamination resistant probe attachment device includes a base, having an attachment portion for attachment of the contamination resistant probe attachment device around an opening in the top cover of the disc drive, and a platform portion extending inwardly from the attachment portion, the platform portion having a centrally located stub tube. A first end of a flexible tube is attached around the stub tube and a second end of the flexible tube has an aperture for receiving the probe used in the probe-mediated test on the disc drive.

Another embodiment of the present invention is a method for performing a probe-mediated test on a disc drive in a contaminated environment. The method includes the steps of attaching a contamination resistant probe attachment device around an opening in the disc drive in an essentially contamination free environment, inserting a probe into the contamination resistant probe attachment device for testing on the disc drive and performing the probe mediated test on the disc drive in a contaminated environment.

These and various other features as well as advantages which characterize the present invention will be apparent from a reading of the following detailed description and a review of the associated drawings.

DETAILED DESCRIPTION

Figure 1:
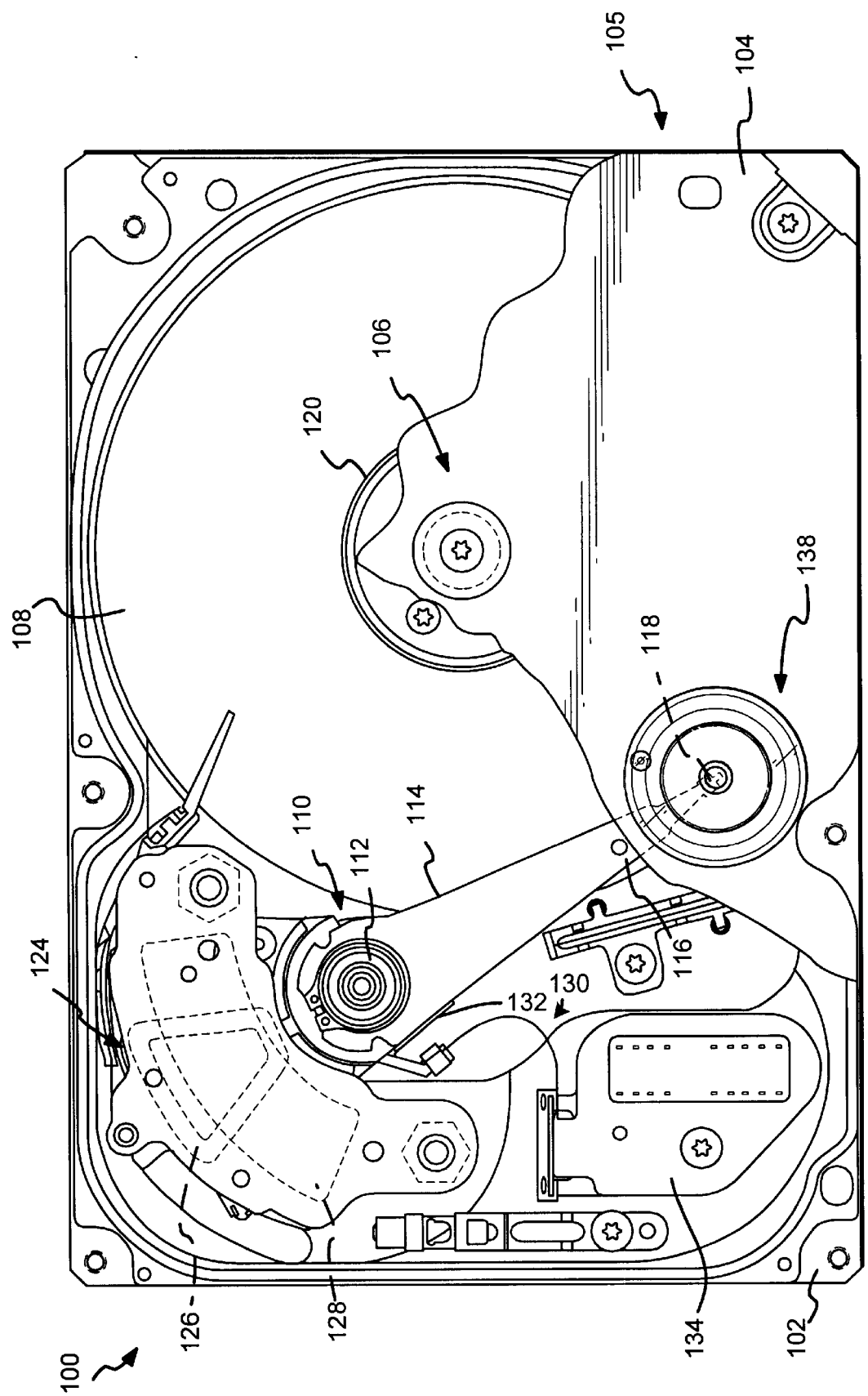
FIG. 1 is a plan view of a disc drive incorporating an embodiment of the present invention showing the primary internal components.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base plate 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider (not shown), enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnet sets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. In some instances, the heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked. In other cases, the heads are stored off the disc surface on load/unload ramps (not shown).

A flex assembly 130 provides the requisite electrical connection paths for the actuator assembly 110 while allowing pivotal movement of the actuator assembly 110 during operation. The flex assembly 130 includes a preamplifier printed circuit board 132 to which head wires (not shown) are connected; the head wires being routed along the actuator arms 114 and the flexures 116 to the heads 118. The preamplifier printed circuit board 132 typically includes circuitry for controlling the write currents applied to the heads 118 during a write operation and a preamplifier for amplifying read signals generated by the heads 118 during a read operation. The flex assembly 130 terminates at a flex bracket 134 for communication through the base plate 102 to a disc drive printed circuit board (not shown) mounted to the bottom side of the disc drive 100.

As noted above, the base plate 102 and top cover 104 cooperate to form a sealed housing 105 for the disc drive 100. In order to maximize disc drive 100 performance and utility, the internal disc drive environment is typically contaminate free or within industry set standards so as to avoid contaminate induced damage to information stored on the discs or to the heads 118. The housing seal must be sufficient to maintain the disc drive's internal environment during normal disc drive operation conditions. However, the top cover 104 of the disc drive 100 typically has an aperture 136 (see FIG. 5) for among other things, access for servo track writing or other testing procedures on the internal components of the disc drive. The aperture 136 will be referred to as a servo track opening 136. In order to maintain the sealed housing for the disc drive, the aperture 136 is sealed with magnetic tape or other such material while the disc drive is in a contaminate free environment.

The servo track opening 136 is typically located in the top cover 104 of the disc drive 100 directly above and in-line with the path that the read/write heads 118 take when moving in an arc across the surfaces of the information storage discs 108. (see FIG. 5) As noted above, the servo track opening 136 is sealed with metallic tape (not shown) or other well known non-permanent means after the servo track writing is completed, but before the disc drive 100 is in a contaminate containing environment. Note that for purposes of the present invention, a contaminate free or essentially contaminate free environment is one recognized within the disc drive industry.

A contamination resistant probe attachment device 138, in accordance with one embodiment of the present invention, is shown attached on the top cover 104 of the disc drive 100 in FIG. 1. The attachment device 138 fits around and over the servo track opening 136 (FIG. 5) on the top cover 104 so that a testing probe 140, for example a capacitance probe, may be passed into and through the attachment device 138 for testing parameters within the disc drive 100. When a probe 140 is positioned in the attachment device 138, the internal environment 142 of the disc drive 100 is sealed from the external environment 144. (see FIG. 5). A seal is formed between the attachment device 138 and the top cover 104 of the disc drive and another seal is formed between the attachment device 138 and the testing probe 140. For purposes of this invention, the contamination resistant probe attachment device 138 seals the internal environment of the disc drive form the external environment of the disc drive where the internal environment of the disc drive needs to be protected from the disc drive's external environment. In some cases this may involve situations where the internal environment of the disc drive has some level of contaminated air, but has a level of contamination that is less than the contamination found in the external environment and would thus benefit.

Figure 2:
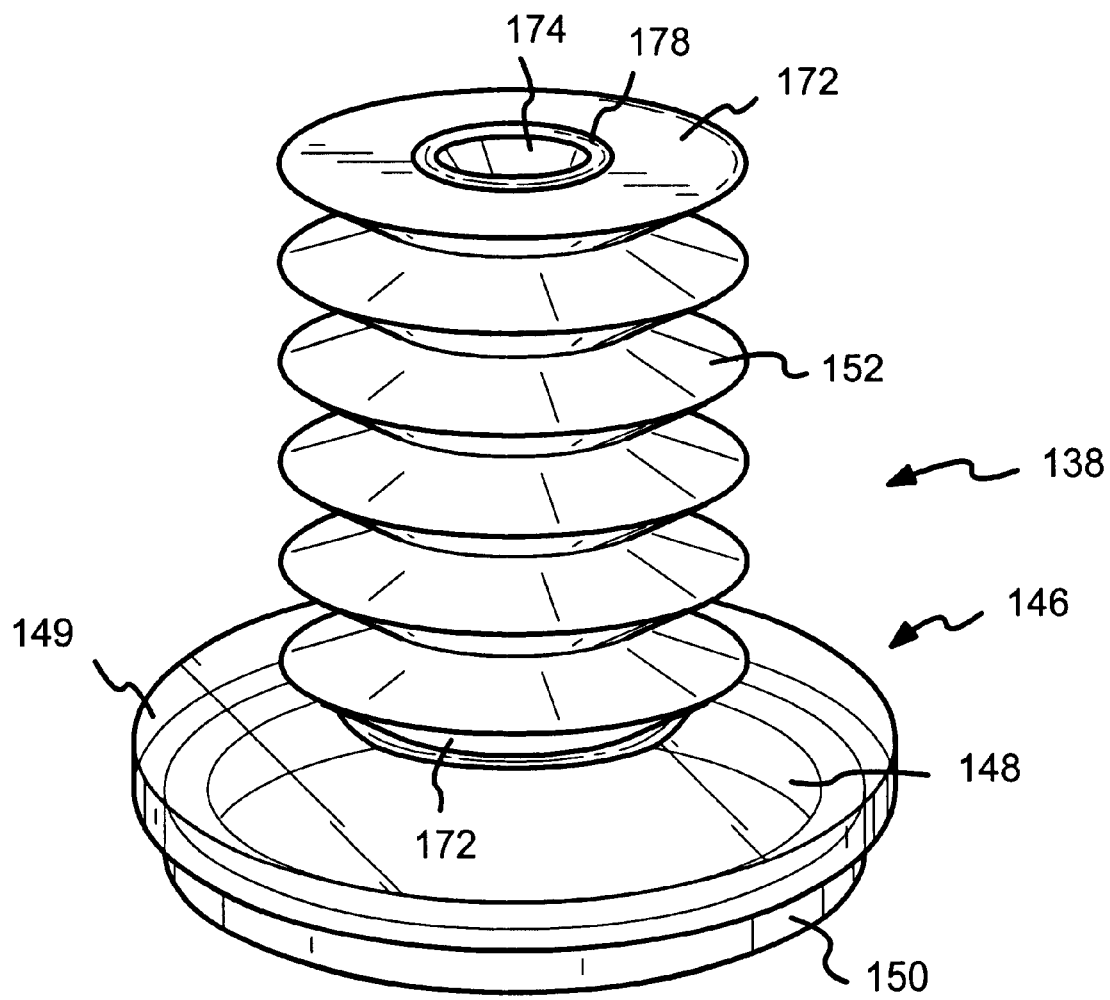
FIG. 2 is a perspective view of the contamination resistant probe attachment device in accordance with an embodiment of the present invention.

A perspective view of the attachment device 138 of the present invention is shown in FIG. 2. The attachment device 138 generally includes a base 146 having a platform portion 148 and an attachment portion 150, and a flexible tube portion 152 attached to the base 146 for receiving and positioning a testing probe 140 within the attachment device 138.

Figure 3:
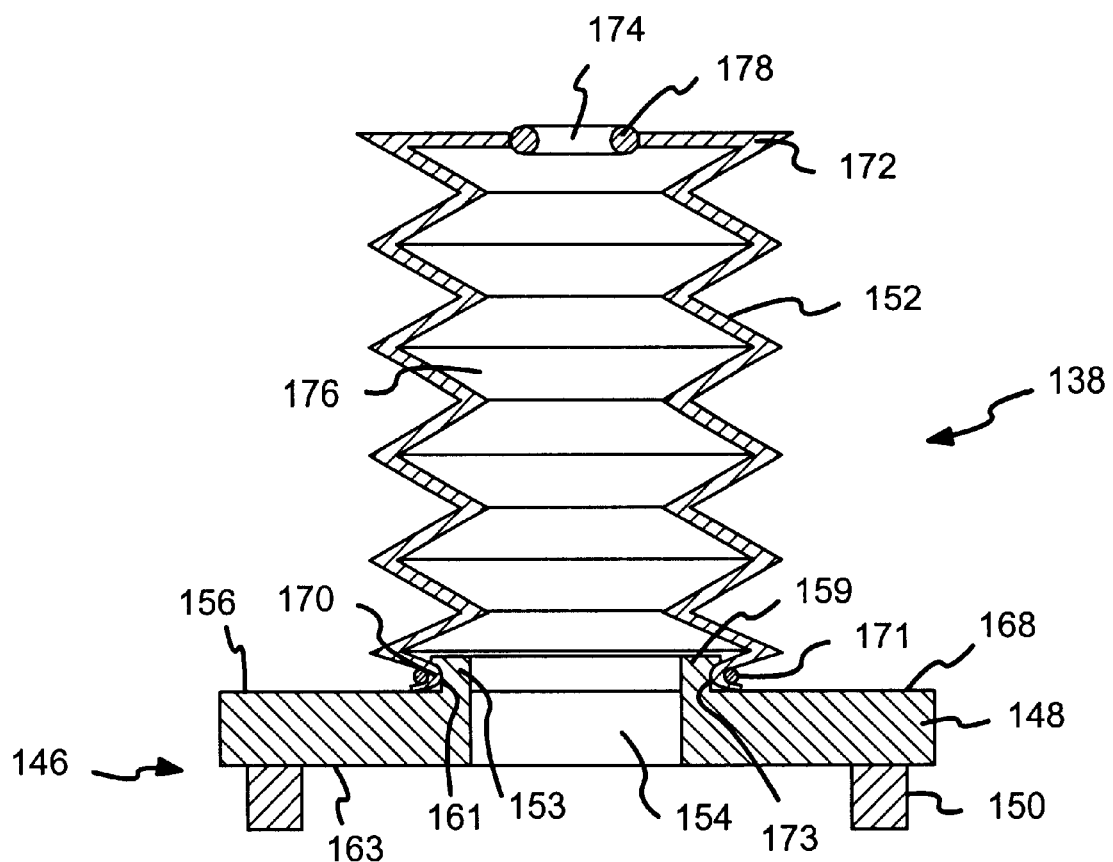
FIG. 3 is a representative sectional view in accordance with an embodiment of the present invention.

One embodiment of the invention is shown in FIG. 3, where the platform portion 148 of the base 146 is a disc shape having a centrally located hollow stub tube 153 that extends upwardly from a top surface 149 of the platform portion 148. The hollow stub tube 153 defines an aperture 154 through the platform portion 148 of the base 146. The stub tube 153 has a distal end 159 from the platform portion 148 that defines a radially extending flange 155. The radially extending flange 155 forms a top portion of a notch 161 formed between the radially extending flange 155 and the top surface 149 of the platform portion 148. The centrally located aperture 154 positioned within the stub tube 153 is preferably centered over the servo track opening 138 of the top cover 104 when the base 146 is attached to the top cover 104.

Note that the size and shape of the servo track opening 136 influences the size and shape of the platform portion 148 of the base 146. Importantly, the platform portion must be of size and shape that completely surrounds the servo track opening 136 while maintaining the seal between the attachment device 138 and the external environment. Therefore, although the platform portion 138 is preferably a disc shape, it may have an oval, rectangular or other shape to better mimic the shape of the particular servo track opening 136. As such, the shape of the platform portion is not limiting to the scope of the invention, as the only constraint on its shape be that the platform portion 138 extend beyond and over the servo track opening 136, or other appropriate opening (see below), in the top cover 104. Other potential platform portion shapes include, but are not limited to, oval, rectangular, square, and the like.

It should also be noted that the attachment device 138 may be modified to fit over any opening in the top cover 104 of the disc drive 100, including a re-sealable opening created solely for use with the attachment device, or openings in the top cover 104 that extend to the top cover's side walls. In such cases the platform structure is simply modified to fit over and around and seal to the opening.

Again referring to FIG. 2, an attachment portion 150 of the base is positioned and attached to an outer diameter 156 of a bottom surface 163 of the of the platform portion 148 for engaging the top cover 104 of the disc drive 100. Note that the shape of the attachment portion 150 is dependent on the shape of the platform portion, and will typically mimic the shape of the outer diameter of the platform portion 148. The attachment portion 150 is typically a pliable material and forms a seal between the top cover 104 of the disc drive 100 and the platform portion 148 of the contamination resistant probe attachment device 138.

In one embodiment of the present invention, the attachment portion 150 of the base 146 is formed from a pressure sensitive adhesive. Typical pressure sensitive adhesives for use with this invention are well known in the disc drive art. Note that it is preferable that the pressure sensitive adhesive not outgas.

In another embodiment of the present invention, the attachment portion 150 of the base 146 is a synthetic elastomer. Typical synthetic elastomers for use with the invention include, but are not limited to, neoprene, etc. The synthetic elastomer may be adhered to the platform portion or may fit within a groove or other retaining structure (not shown) along the bottom surface 157 of the platform portion 148. In one embodiment, a clamp (not shown) or clamps compress the base 146 against the top cover 104 of the disc drive 100, and so sandwiches the synthetic elastomer between the platform portion 148 of the base 146 and the top cover 104 of the disc drive 100. The clamping force compresses the synthetic elastomer forming a seal between the attachment device and the top cover. Other devices which generate a compressive type force may be used in replacement of the clamp to compress the base onto the top cover, as are well known in the art. It is also envisioned that the synthetic elastomer may be adhered to the top cover of the disc drive with a thin layer of adhesive.

Further, it is envisioned that in an embodiment of the invention, the platform portion 148 of the base has a contiguous lip 158 to which the attachment portion 150 attaches. (see FIG. 5) The lip 158 extends in a downward direction from the outer diameter 156 of the bottom surface of the platform portion. The lip 158 generally raises the platform portion 148 of the base 146 off the top cover 104 and may provide additional viewing angles through the servo track opening 136, as discussed in more detail below. The attachment portion is attached to the lip 158 as in a manner discussed for the attachment portion 150 to attach to the platform portion 148.

Figure 4:
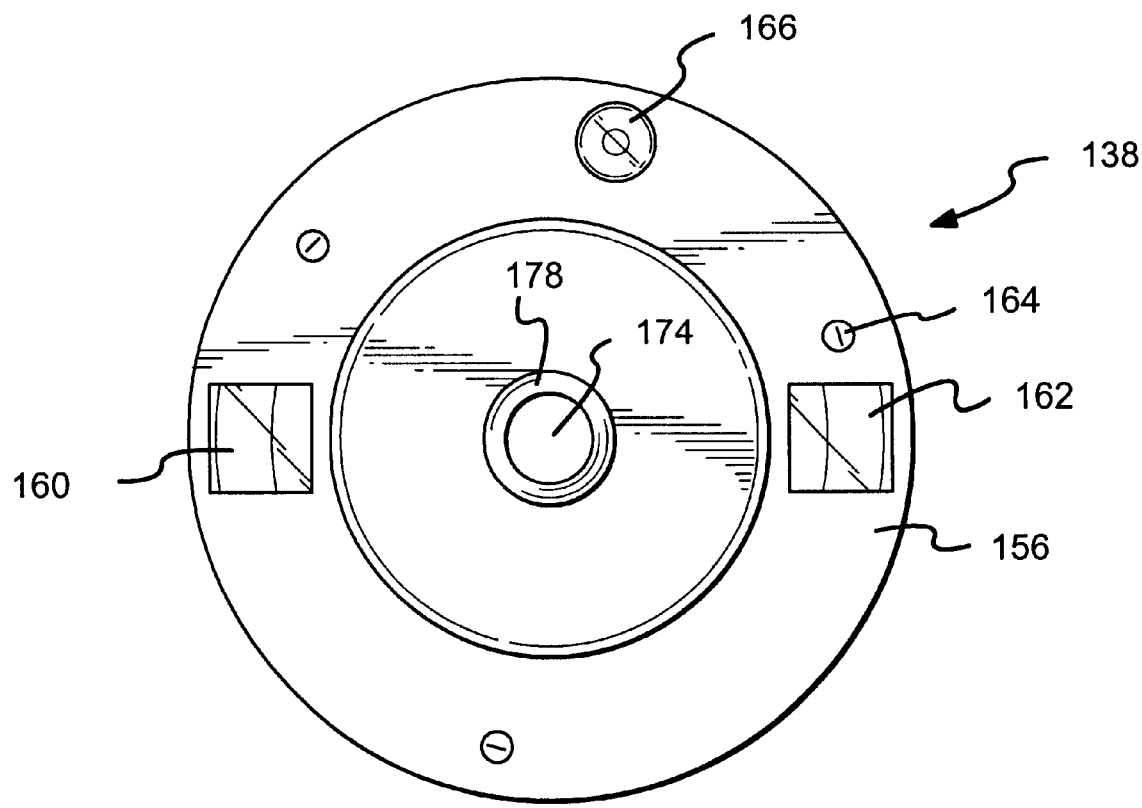
FIG. 4 is a representative top view of the contamination resistant probe attachment device in accordance with an embodiment of the present invention.

In another embodiment of the present invention, a transparent window 160 or windows for viewing the inside of the disc drive 100 is located in the platform portion 148, as is shown in FIG. 4. The shape and size of the transparent window(s) 160 may vary. In one embodiment, the entire platform portion 148 of the base 146 is a transparent window made of a chemically inert transparent material, such as polycarbonate. This embodiment allows for maximal viewing through the attachment device into the servo track opening 138. In other embodiments, transparent window(s) 160 are discrete shapes and are located in the platform portion of the base. The transparent window(s) 160 may extend radially away from the interiorly located stub tube in the platform portion to the outer diameter 156 of the platform portion 148 and be of a width consistent with the width of the servo track opening 136. Other shapes and sizes for the transparent window are envisioned to be within the scope of the present invention as long as the user may view through the transparent window into the disc drive.

As previously noted, the material used to make the transparent window 160 is typically an inert substance such as polycarbonate. Substances such as nylon, that outgas, should be avoided. Note also that in some embodiments of the present invention a section of the transparent window may include a magnification feature 162 to provide for a close-up view of the relevant testing area within the disc drive 100. Different powers of magnification material can be used.

Continuing to reference FIG. 4, an embodiment of the present invention has a plurality of thumb screws or pins 164 that extend through the platform portion 148 to contact the top cover 104 of the disc drive 100. The pin 164 lengths are manipulated in coordination with each other to adjust the orientation of the platform portion 148 in relation to the top cover 104 and internal environment of the disc drive. The pins 164 maximal length should preclude the platform portion 148 from breaking the engagement between the attachment portion 150 of the base and the top cover 104. The pins 164 may be located to the inside or outside of the attachment portion 150, and adjustment of the pins 164 can be accomplished by any known means within the art, for example, by turning the pins within treaded bores formed through the platform portion of the base. Other structures can be used to orient the platform portion with respect to the disc drive and are contemplated as within the scope of the present invention.

Again referring to FIG. 4, a builders bubble 166, or other orientation dependent indicator, may be located in the top surface 168 of the platform portion 148 for providing an indication as to whether the base 146 of the attachment device 138 is level with respect to the top cover 104 of the disc drive 100.

A flexible tube 152 extends in an upward direction from the aperture 154 formed through the platform portion 148, having a first end 170 and a second end 172, (see FIG. 3). The first end 170 of the flexible tube 152 telescopically engages the stub tube 153 and sits within the notch 161 formed by the stub tube flange 155 and the top surface 149 of the platform portion 148.

Continuing to reference FIG. 3, one embodiment of the invention has the first end 170 of the flexible tube 152 is held in the notch 161 between the stub tube 153 and the platform portion 148 by an O-ring 171 or other elastomer that snaps against the first end 170 of the flexible tube 152 and compresses the first end 170 of the flexible tube 152 against the wall 173 of the stub tube 153 and holds the flexible tube 152 in place. The O-ring 171 sits within the notch 161 and holds and seals the first end 170 of the flexible tube to the stub tube 153.

In another embodiment of the invention, the first end 170 of the flexible tube 152 is lined with an elastomer type substance (not shown) that directly snaps and holds the first end of the flexible tube in the groove.

Note that it is envisioned that other structures may be used to attach the flexible tube 152 to the platform portion 148 of the base 146. For instance, the base 146 may define an outwardly radial angled wall (not shown) for receiving the first end 170 of the flexible tube. Alternatively, the flexible tube and platform portion may engage through a leur lock type structure (not shown), or the flexible tube may be adhered to a stub tube wall 173 or any other extending structure from the platform portion. It is envisioned, however, in each case that the flexible tube form a seal with the base.

The flexible tube 152 extends away from the first end 170. The second end 172 of the flexible tube defines a probe engagement aperture 174 for receiving a testing probe 140. (see FIG. 2 and 3). A cavity 176 having a diameter sufficient for accepting typical disc drive testing probes 140, for example, a capacitance probe, is defined by a flexible tube wall 177. Preferably the cavity 176 has sufficient space to allow the probe axial movement within the confines of the tube 152, and most preferably, the cavity 176 has sufficient space to allow the probe both axial and radial movement within the cavity.

The probe engagement aperture 174 in the flexible tube 152 for accepting a testing probe 140 is preferably lined with an O-ring 178 or other compressive/sealant type substance so as to form a seal between the attachment device 138 and the inserted probe 140. (see FIGS. 2 and 3). The O-ring 178 engagement between the attachment device 138 and the probe 140 allows for translational movement of the probe 140 over the O-ring 178, and so allows the probe 140 to be positioned within the attachment device 138, and in some cases into the disc drive 100, to properly perform the probes required task.

In a preferred embodiment, the flexible tube 152 is a bellows. (see FIGS. 2, 3, and 4). The bellows can be compressed, elongated or tilted in relation to the base portion 146 of the attachment device 138. A probe 140 positioned through the probe engagement aperture 174 of the bellows may be manipulated in the attachment apparatus by a combination of sliding the probe past the O-ring 178 into the cavity 176 formed within the bellow walls and/or by manipulation of the bellows to slew, swivel or tilt the probe in any direction within the cavity 176 while maintaining the seal between the attachment device 138 and the probe 140. Once the bellows is positioned it will remain positioned until manipulated by the user. The bellows may be composed of any inert type substance known within the art for bellows construction.

Figure 5:
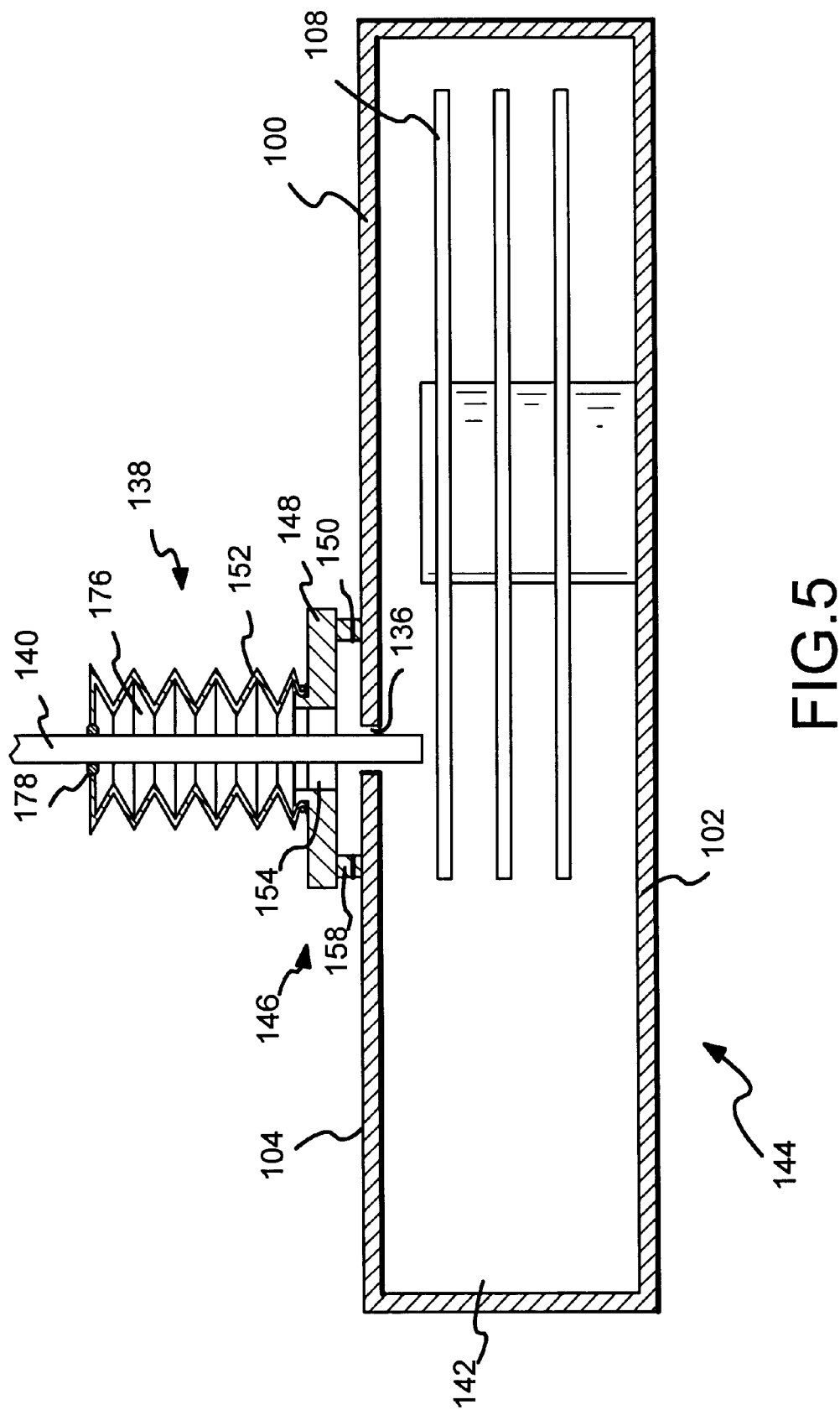
FIG. 5 is a representative sectional view of the contamination resistant probe attachment device and a corresponding probe attached to a disc drive in accordance with an embodiment of the present invention.

As shown in the cross sectional views of FIGS. 3 and 5, a probe 140 is inserted into the probe engagement opening 174 of the flexible tube 152 and moved in an axial direction through the interior chamber 176 of the bellows to a proper testing position either through the servo track opening 136 or to a position within the attachment device 138.

The seal extending from the attachment portion 150 of the base 146 and the seal on the interior surface of the engagement portion 174 of the second end 172 of the bellows maintain a relatively contamination free environment in the disc drive 100. As discussed briefly above, the seals of the present invention resist the co-mingling of the disc drive's internal environment 142 with the disc drive's external environment 144. The quality of the seals is adjustable, from airtight to a simple barrier that reduces contamination into the drive over what would enter in the absence of the barrier.

Figure 6:
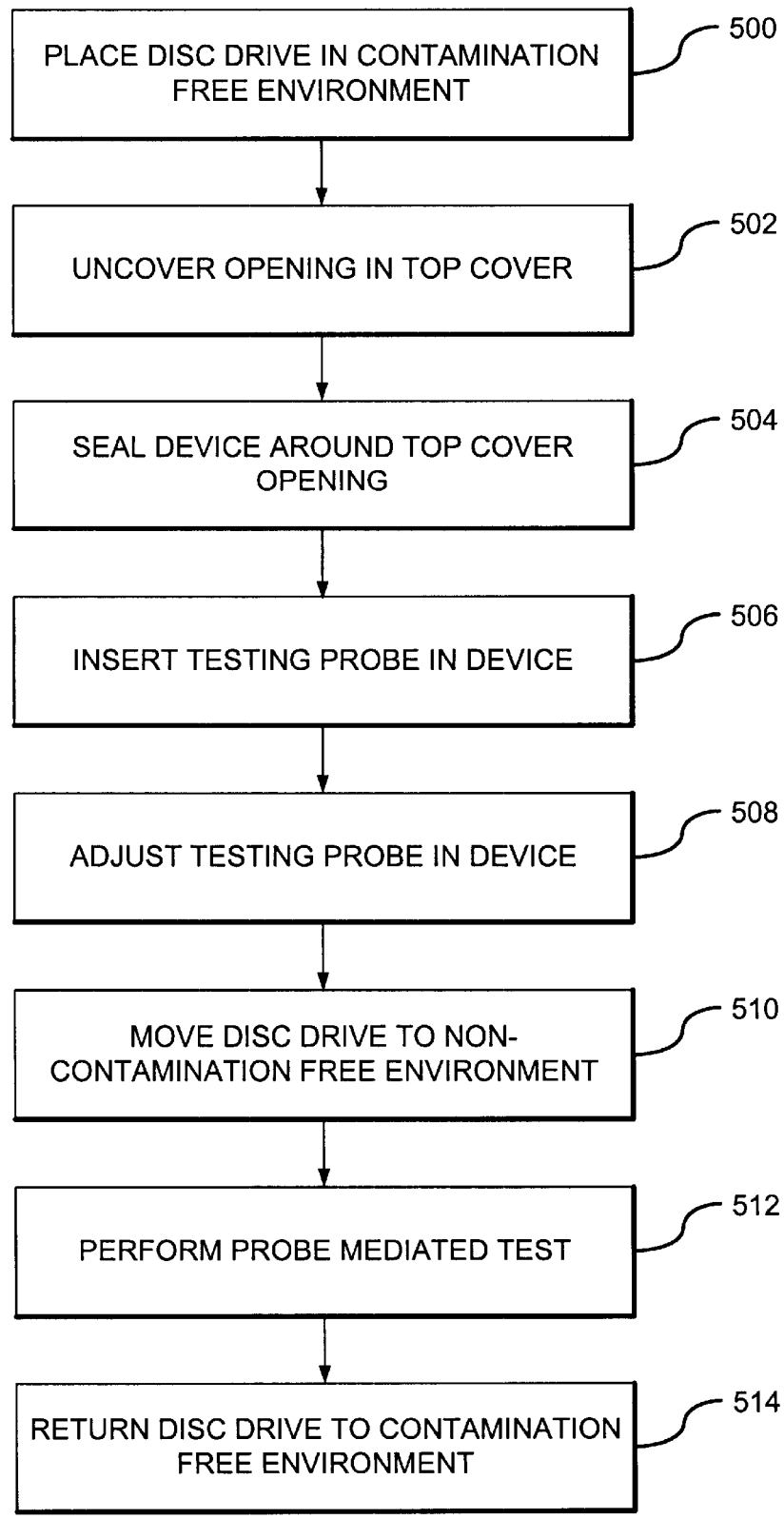
FIG. 6 is a flow chart of the method of attaching the contamination resistant probe attachment device with a corresponding probe to a disc drive in accordance with an embodiment of the present invention.

The present invention is also a method for performing tests on a disc drive 100 where the interior of the disc drive maintains a relatively contamination free environment but the tests are performed on a disc drive located in a contamination containing environment. As illustrated in FIG. 6, in Operation 500, a disc drive is obtained and placed in a substantially contamination free environment. Operation 500 is followed by Operation 502, where the servo track opening in the top cover is uncovered. Operation 502 is followed by Operation 504, where an attachment device of the present invention is sealed around the servo track opening. Operation 504 is followed by Operation 506, where a testing probe is inserted into the attachment device, where the probe is used to perform a test on the disc drive and a seal between the probe and the attachment device is formed. Operation 506 is followed by an optional Operation 508, where the testing probe is adjusted with respect to the attachment device to properly orient the probe for the testing procedure. Operation 508 is followed by Operation 510, where the disc drive having the attachment device secured to the top cover is removed from the substantially contaminate free environment and moved to a contaminate containing environment, for example a laboratory bench in a non-clean room setting. Operation 510 is followed by Operation 512, where the testing procedure is performed on the disc drive in the contaminate containing environment. Operation 512 is followed by Operation 514, where the disc drive having the attachment device attached to it is returned to a contamination free environment for removal of the attachment device and sealing of the servo track opening with a magnetic tape.

In summary, the present invention is a contamination resistant probe attachment device (such as 138) for coupling a testing probe (such as 140) to the interior (such as 142) of a disc drive (such as 100), where the testing probe performs a test or evaluation on the disc drive (such as 100) or a disc drive component (such as 108). The contamination resistant probe attachment device (such as 138) protects the interior (such as 142) of the disc drive from contamination from outside (such as 144) the disc drive (such as 100) during the testing probe (such as 140) mediated test. The contamination resistant probe attachment device has a base (such as 146). The base (such as 146) includes an attachment portion (such as 150) for attaching the contamination resistant probe attachment device around an opening (such as 136) in a top cover (such as 104) of the disc drive (such as 100) and a platform portion (such as 148) having a centrally located stub tube (such as 153). The stub tube (such as 153) has an aperture (such as 154) that communicates with the opening (such as 136) in the top cover (such as 104) of the disc drive. A flexible tube (such as 152) is attached to the platform portion of the base, where the flexible tube (such as 152) has a first end (such as 170) attached to the centrally located stub tube (such as 153) and a second end (such as 172) having an aperture (such as 174) for receiving the testing probe (such as 140).

In another preferred embodiment of the present invention, the stub tube (such as 153) has a radially extending flange (such as 155) that forms a groove (such as 161) between the stub tube and the platform portion (such as 148). The first end (such as 170) of the flexible tube (such as 152) sitting within the groove (such as 161).

In another preferred embodiment of the present invention the attachment portion (such as 150) of the base (such as 146) is an adhesive.

In another preferred embodiment of the present invention, the flexible tube (such as 152) is a bellows.

In another preferred embodiment of the present invention, the aperture (such as 174) in the second end (such as 172) of the flexible tube (such as 152) is lined by an O-ring (such as 178).

In another preferred embodiment of the present invention, the platform portion (such as 148) of the base (such as 146) is transparent. The transparent platform portion may be formed from polycarbonate, and may have a magnification feature (such as 162) in the platform portion that provides for magnification of objects viewed through the platform portion.

In another preferred embodiment of the present invention, the contamination resistant probe attachment device (such as 138) has a plurality of pins (such as 164) extending downwardly from the platform portion (such as 148) of the base (such as 146) so that adjustment of the length of the pins causes an effect on the orientation of the platform portion relative to the top cover (such as 104) of the disc drive (such as 100). The platform portion may have a builders bubble (such as 166) inset in the platform portion for indicating whether the platform portion is level with the top cover (such as 104) of the disc drive (such as 100).

In another preferred embodiment of the present invention, the attachment portion (such as 150) is a synthetic elastomer and a clamp or other compression device sandwiches the synthetic elastomer between the platform portion (such as 148) and the top cover (such as 104) of the disc drive (such as 100).

In another preferred embodiment of the present invention, the first end (such as 170) of the flexible tube (such as 152) is telescopically attached to the stub tube (such as 153) in the platform portion (such as 148) of the base (such as 146).

The present invention may also be viewed as a method for performing a testing probe mediated test or evaluation on a disc drive in a non-contamination free environment. The method includes the steps of attaching a contamination resistant probe attachment device around an opening in the disc drive in an essentially contamination free environment (such as in step 500), inserting the probe into the contamination resistant probe attachment device for testing on the disc drive (such as in step 506) and performing the probe mediated test on the disc drive in a non-contamination free environment (such as in step 512). The method may include forming a seal around the servo track opening in the top cover of the disc drive between the contamination resistant probe attachment device and the top cover of the disc drive (such as in step 504). Further, the method may include returning the disc drive to an essentially contamination free environment (such as in step 514), removing the contamination resistant probe attachment device from the disc drive and re-sealing the servo track opening on the top cover with a metallic tape.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A contamination resistant probe attachment device for coupling a probe for performing a probe mediated test on a disc drive to the interior of the disc drive, the device comprising:

a base having an attachment portion for attachment of the contamination resistant probe attachment device around an opening in a top cover of the disc drive and a platform portion extending inwardly from the attachment portion, the platform portion having a centrally located receiving stub tube spaced inward from the attachment portion and projecting from the platform portion defining an annular surface on the platform portion around the stub tube, the stub rube having an aperture that communicates with the opening in the top cover of the disc drive; and a flexible tube having two ends, a first end attached to the centrally located stub tube in the platform portion of the base and a second end having an aperture for receiving the probe used in the probe mediated test on the disc drive to protect the disc drive from contamination from outside the disc drive during the probe mediated test.

2. A contamination resistant probe attachment device for coupling a probe for performing a probe mediated rest on a disc drive to the interior of the disc drive, the device comprising:

a base having an attachment portion for attachment of the contamination resistant probe attachment device around an opening in a top cover of the disc drive and a platform portion extending inwardly from the attachment portion, the platform portion having a centrally located receiving stub tube spaced inward from the attachment portion and projecting from the platform portion defining an annular surface on the platform portion around the stab tube, the stub tube having an aperture that communicates with the opening in the top cover of the disc drive; and a flexible tube having two ends, a first end attached to the centrally located stub tube in the platform portion of the base and a second end having an aperture for receiving the probe used in the probe mediated test on the disc drive to protect the disc drive from contamination from outside the disc drive during the probe mediated test, wherein the stub tube has a distal end from the platform portion, the distal end having a radially extending flange forming a groove between the stub tube and the platform portion and wherein the first end of the flexible tube sits within the groove.

3. The contamination resistant probe attachment device of claim 1 wherein the attachment portion of the base is an adhesive.

4. The contamination resistant probe attachment device of claim 1 wherein the flexible tube is a bellows.

5. The contamination resistant probe attachment device of claim 1 wherein the aperture in the second end of the flexible tube is lined by an O-ring.

6. The contamination resistant probe attachment device of claim 1 wherein a portion of the platform portion of the base is transparent.

7. The contamination resistant probe attachment device of claim 6 wherein the platform portion is formed from polycarbonate.

8. The contamination resistant probe attachment device of claim 6 wherein a section of the platform portion has a magnification feature.

9. The contamination resistant probe attachment device of claim 1 further comprising a plurality of pins extending downwardly from the platform portion of the base, wherein adjustment of the length of any one pin causes an effect on the orientation of the platform portion relative to the top cover of the disc drive.

10. The contamination resistant probe attachment device of claim 9 further comprising a builders bubble inset in the platform portion for indicating whether the platform portion is level with the top cover of the disc drive.

11. The contamination resistant probe attachment device of claim 1 further comprising a clamp and wherein the attachment portion of the base is a synthetic elastomer and the clamp sandwiches the synthetic elastomer between the platform portion of the base and the top cover of the disc drive.

12. The contamination resistant probe attachment device of claim 1 wherein the first end of the flexible tube is telescopically attached to the stub rube in the platform portion of the base.

13. A method for pert brining a probe mediated test on a disc drive in a non-contamination free environment, the method comprising the steps of:
(a) attaching a contamination resistant probe attachment device around an opening in a disc drive in an essentially contamination free environment,
(b) inserting a probe into the contamination resistant probe attachment device for testing on the disc drive;
(c) removing the disc drive from the essentially contamination free environment with the probe and attachment device attached to the disc drive; and
(d) performing the probe mediated test on the disc drive in a non-contamination free environment.

14. The method of claim 13 wherein the opening in the disc drive is a servo track opening in a top cover of the disc drive and the attaching step (a) comprises forming a seal around the servo track opening in the top cover between the contamination resistant probe attachment device and the top cover.

15. The method of claim 13 wherein the contamination resistant probe attachment device has a probe engagement aperture for engaging the testing probe and the inserting step (b) comprises forming a seal between the probe engagement aperture and the testing probe.

16. The method of claim 13 further comprising the steps of:
(e) returning the disc drive to the essentially contamination free environment
(f) removing the contamination resistant probe attachment device from the disc drive; and
(g) sealing the opening in the disc drive.

17. The method of claim 13 wherein the probe is a capacitance probe.

18. A contamination resistant probe attachment device for coupling a testing probe to an internal environment of a disc drive, the contamination resistant probe attachment device comprising:
a generally disc shaped base having an attachment portion for attaching the base around an opening in a top cover of a disc drive, the base having an annular platform portion defining an aperture spaced inward from the attachment portion; and
means extending from the platform portion of the base around the aperture for receiving the testing probe and preventing contamination from entry into the internal environment of the disc drive through the opening in the top cover when the base is attached to the top cover of the disc drive.

19. The contamination resistant probe attachment device of claim 18 wherein the means comprises a flexible tube portion for receiving the testing probe.

20. The contamination resistant probe attachment device of claim 19 wherein the flexible tube is a bellows.

21. The contamination resistant probe attachment device of claim 18 wherein the base has a flat annular disc shaped platform portion from which the means for supporting the testing probe extends and the attachment portion forms a seal around the opening between the top cover and the platform portion.

22. The contamination resistant probe attachment device of claim 21 wherein the attachment portion is a pressure sensitive adhesive.

23. The contamination resistant probe attachment device of claim 18 wherein the means extends around the aperture in the base.

* * * * *

UNITED STATES PATENT AND TRADEMARK OFFICE
CERTIFICATE OF CORRECTION

PATENT NO. : 6,597,163 B2
DATED : July 22, 2003
INVENTOR(S) : Fioravanti

It is certified that error appears in the above-identified patent and that said Letters Patent is hereby corrected as shown below:

Column 10,
Line 29, delete "rest" and insert -- test --.
Line 40, delete "stab" and insert -- stub --.

Column 11,
Line 24, delete "pert brining" and insert -- performing --.
Line 29, delete "," and insert -- ; --.

Column 12,
Line 6, insert -- ; -- after "environment".

Signed and Sealed this

Thirtieth Day of December, 2003

JAMES E. ROGAN
*Director of the United States Patent and Trademark Office*